United States Patent [19]

Linder

[11] 4,281,819
[45] Aug. 4, 1981

[54] BALANCED STEM GATE VALVE

[76] Inventor: Morris B. Linder, 1403 W. Brooklake Dr., Houston, Tex. 77077

[21] Appl. No.: 86,609

[22] Filed: Oct. 22, 1979

Related U.S. Application Data

[63] Continuation-in-part of Ser. No. 889,271, Mar. 23, 1978, abandoned.

[51] Int. Cl.³ .............................................. F16K 3/02
[52] U.S. Cl. .................................. 251/328; 251/282; 251/284
[58] Field of Search ............... 251/326, 327, 328, 329, 251/282, 284, 315

[56] References Cited

U.S. PATENT DOCUMENTS

| 2,889,134 | 6/1959 | Bryant | 251/328 |
|---|---|---|---|
| 3,269,692 | 8/1966 | Shafer | 251/315 |
| 3,270,772 | 9/1966 | Rakus | 251/315 |
| 3,314,442 | 4/1967 | Volpin | 251/328 |
| 3,533,598 | 10/1970 | Tillman | 251/328 |
| 3,575,380 | 4/1971 | Siver | 251/329 |
| 4,029,294 | 6/1977 | McCaskill et al. | 251/328 |
| 4,124,194 | 11/1978 | Alvarez et al. | 251/328 |

FOREIGN PATENT DOCUMENTS 532732  11/1956  Canada .................... 251/282

*Primary Examiner*—Martin P. Schwadron
*Assistant Examiner*—H. Jay Spiegel
*Attorney, Agent, or Firm*—Gunn, Lee & Jackson

[57] ABSTRACT

A balanced stem gate valve incorporating a slab gate having hard friction resistant sealing face surfaces that cooperate with friction resistant seat assemblies to provide for low operating torque under high pressure conditions. Seat carrier rings are supported within the valve chamber and define seal recesses within which are retained a metal back-up seal ring and a hard friction resistant face sealing ring that is compatible with the sealing surface material of the gate. Metal-to-metal back sealing is provided between the stem and bonnet and between the pressure balancing stem and the valve body structure, depending upon the position of the reversable gate member. As an alternative, a gate valve construction is provided with substantial pressure balancing capability through incorporation of a closed, non-vented balancing chamber incorporating a balancing stem that is internally bored so as to cooperate with the balancing chamber and define a large volume chamber that establishes a low compression ratio as the pressure balancing stem is inserted into the pressure balancing chamber. Packing assemblies are provided, the sealing ability of which can be enhanced by injection of sealant material between packing rings.

1 Claim, 8 Drawing Figures

BALANCED STEM GATE VALVE

BACKGROUND OF THE INVENTION

This is a continuation-in-part of U.S. patent application Ser. No. 889,271 of Morris B. Linder, filed on Mar. 23, 1978, now abandoned, and entitled Balanced Stem Gate Valve.

FIELD OF THE INVENTION

This invention pertains generally to valves and more particularly to gate valves suitable for high pressure service. The invention contemplates a substantially balanced stem gate valve wherein the balancing stem is sealed with respect to the atmosphere and wherein a floating seal is provided to accommodate lateral movement of the gate member in response to pressure differential forces.

DESCRIPTION OF THE PRIOR ART

Slab-type gate valves are commonly used for a variety of high pressure service applications such as for valve control of wellheads and for liquid and gas transmission service. The petroleum industry makes extensive use of through conduit gate valves, that is, gate valves having valve members, which in the open position form a portion of the bore through the valves, thereby presenting substantially unbroken, smooth wall conduit in which there is no more pressure drop in an equal length of equal diameter pipe.

One of the problems in gate valve design is the problem of an unbalanced pressure force on the valve operating stem, tending to force the gate and valve stem upward through the valve bonnet. This force, functionally related to the differential pressure between the interior of the valve and the atmosphere and also the stem diameter, typically requires that a large torque be applied to the drive wheel when the valve is actuated in a downward direction.

To overcome this force imbalance, valves have been developed that provide a pressure balancing stem extending from the gate member is opposing relation to the operating stem of the valve. The pressure balancing stem extends through a seal in the valve body with the free end at atmospheric or ambient pressure. The energized diameter of the pressure balancing stem is chosen so as to provide a pressure force component essentially opposing and thus balancing the pressure force component on the upper valve stem. Typical balanced stem gate valves are shown in U.S. Pat. Nos. 3,923,285 to Diehl, et al; U.S. Pat. Re. 27,789 to Tillman; 3,696,831 to Fowler, et al; and 3,026,084 to Bryant. It will be seen from the above disclosed embodiments that the bottom end of the lower valve stem is at atmospheric or ambient pressure and the chamber accomodating the valve stem is vented directly to the atmosphere.

It is apparent from the above description that if the seal between the lower valve stem and the valve body develops a leak, the pressurized fluid being controlled by the valve may be directly transmitted from the internal valve chamber to the external environment. Further, the entire pressure differential exists across the lower stem seal so that any leak across the seal, once begun, quickly becomes aggravated. Moreover, any particulate, such as sand, pipe scale or the like, contained within the fluid may quickly enlarge the leakage path by abrasive erosion, thus accelerating the leakage and perhaps developing a dangerous condition, especially if the pressurized fluid is of hazardous nature.

When the gate member of a valve is moved linearly between the open and closed positions, pressure differential variations occur across the gate member so that the gate member must move laterally with respect to the body of the valve if the lateral movement must be accommodated by the sealing means provided for sealing along both surfaces of the gate valve. In the prior art, spring-loaded seals have been used, such as depicted in U.S. Pat. No. 3,013,769 to Volpin, and U.S. Pat. No. 2,950,897 to Bryant. Such mechanical spring urging means are subject to breakage and also to corrosion when placed in the potentially corrosive fluids from unrefined wellhead petroleum products. Additionally, such spring biasing means do not exert a continuous and uniform pressure around the periphery of the valve seat and may, therefore, subject the valve seats to eccentric forces which tend to cock the valve seat and prevent proper operation of the valve.

Another mechanical means used for urging the valve seat toward the gate member may take the form of a belleville washer disposed between the valve body and the seal ring, as depicted in U.S. Pat. No. 3,188,049 to Zawacki, et al and U.S. Pat. No. 3,026,084 to Bryant. The belleville washer is subject to the same mechanical problems as the springs discussed above, and, additionally, is frequently disposed in a location open to the fluid stream whereby particulate matter might agglomerate adjacent the washer and interfere with its ability to freely accommodate the relative movement of the gate member.

In slab-type gate valves, which are typically desirable because of their simplicity, the gate element is forced against the downstream seat by upstream pressure. Under high pressure conditions, such as 15,000 psig for example, the gate will be caused to bear against the downstream seat with such great force that frictional forces will develop to such degree that operation of the valve is extremely difficult. Also the gate or seat may tend to gall upon movement of the gate across the seat, thus possibly causing deterioration of the gate or seat to such extent that failure occurs.

It is therefore an important feature of this invention to provide a gate valve which is sealed to the surrounding environment and which requires a minimum torque to actuate the valve.

It is a further object of the present invention to provide a gate valve which is sealed to the outside environment and which incorporates a balanced stem arrangement for producing the torque required to actuate the valve.

It is yet another object of the present invention to provide a novel floating seat arrangement wherein the seat is uniformly urged against the gate member and where the urging means does not interfere with fluid flow through the conduit.

It is also a feature of this invention to provide relatively friction resistant sealing surfaces on the gate and seats to promote extended service life even under high pressure utilization of the valve.

Other and further objects, advantages and features of the invention will become obvious to one skilled in the art upon an understanding of the illustrative embodiments about to be described, and various advantages, not referred to herein, will occur to one skilled in the art upon employment of the invention in practice.

SUMMARY OF THE INVENTION

The present invention is directed to the provision of a gate valve having substantially balanced stem characteristics and which does not require an atmospheric vent for achieving ease of valve operation. The invention relates to a floating valve seat construction which functions effectively to minimize the valve stem torque required to actuate the valve. The balanced valve stem arrangement is defined by a cylindrical balancing stem connected to the gate member and internally bored, which bore opens into a chamber which is sealed from the internal pressure of the valve and also from direct contact with the invironment. A chamber of substantial volume is thereby created which can accommodate compression of gas as the balancing stem is moved into it.

In one exemplary embodiment of this invention, the seat assembly includes a seat carrier that is press-fitted within a seat recess and which is effectively sealed with respect to the valve body by a metal seal ring formed of dead soft metal such as Armco soft iron, for example. The seat carrier is formed to define a seat recess within which is retained a seat ring composed of a hard, wear-resistant material such as stellite with a seat sealing ring such as might be composed of polytetrafluoroethylene that is filled with fiberglass. The seat sealing ring, which may comprise other materials as well, is located in a seal pocket defined between the seat and seat recess and establishes a seal between the seat and carrier.

Although the increased pressure due to compression effects, when the bored stem enters the sealed chamber, will somewhat offset the pressure balance of the stem, the increase in pressure is relatively insignificant compared with the differential pressure between the interior of the valve and the compressed gas within the bore.

The required actuating torque is further reduced by means of a novel floating seat arrangement whereby a nonmetallic, resilient urging means is disposed adjacent the valve seat to exert a continuous and uniform pressure against the valve seat toward the gate body. The urging means does not interfere with fluid flow within the conduit and is not subject to mechanical failure as is a conventional spring or belleville washer.

The valve stem and pressure balancing stem may be provided with annular back seating surfaces that establish sealing contact with mating back seating surfaces of the bonnet and valve body respectively. By moving the valve actuating mechanism to the full extent in either the opening or closing direction, a metal-to-metal back seat seal will be developed, thereby further enhancing the sealing ability of the valve, especially in high pressure service. The back seating arrangement also functions to define stop means for accurate positioning of the gate in the open or closed position thereof.

The valve body is formed to receive upper and lower metal inserts that are internally tapered to define a frusto-conical seating surface for metal-to-metal sealing with corresponding tapered sealing surfaces defined on the operating stem and trunnion.

The gate, which is of the reversible type, may be provided with an overlay of wear and friction resistant metal which cooperates with metal wear and friction resistant face sealing elements to provide for low torque operation even at extremely high working pressure. Moreover, these cooperative materials effectively prevent galling or erosion of the saling surfaces of the gate or seats and provide for optimum operating capability at all pressure ranges.

The valve mechanism may be provided with a telltale venting system that provides a visual external indication in the event the stem packing or the balancing stem packing should develop a leak. If leaking, the packing assemblies may be adjusted by injection of sealant material to re-establish efficient sealing between the stems and the bonnet or body.

BRIEF DESCRIPTION OF THE DRAWINGS

In order that the manner in which the above-recited advantages and objects of the invention are attained, as well as others which will become apparent, can be understood in detail, a more particular description of the invention, briefly summarized above, may be had with reference to the specific embodiment thereof that is illustrated in the appended drawing, which drawing forms a part of the specification. It is to be understood, however, the the appended drawing illustrates only a typical embodiment of the invention, and, therefore, is not to be considered limiting of its scope, for the invention may admit to other equally effective embodiments.

IN THE DRAWINGS

Figure 1:
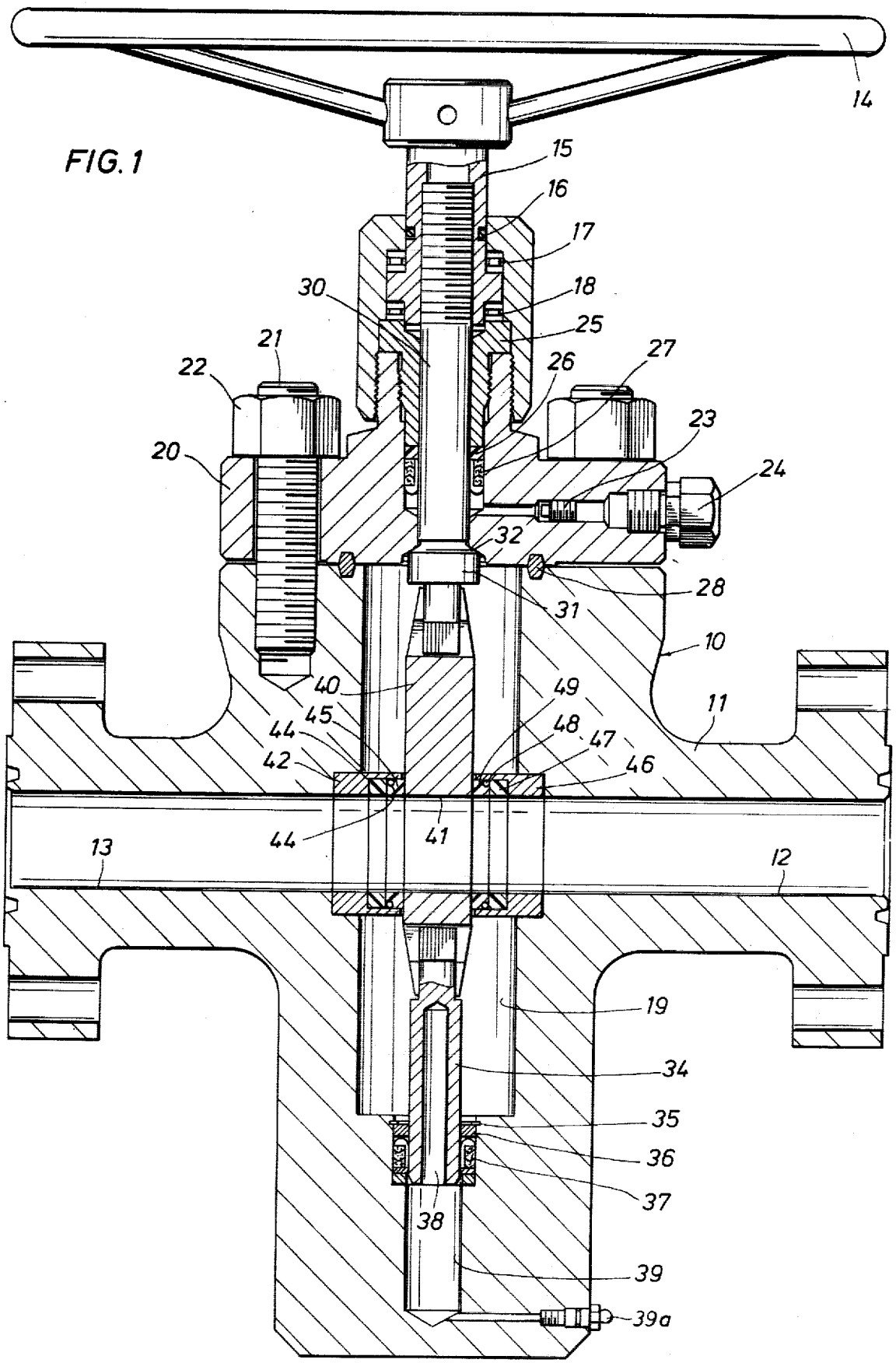

FIG. 1 is a cross-sectional view of a gate valve assembly constructed in accordance with the present invention and depicting the balanced valve stem assembly, floating seat assembly and metal-to-metal stem seal structure.

Figure 2:
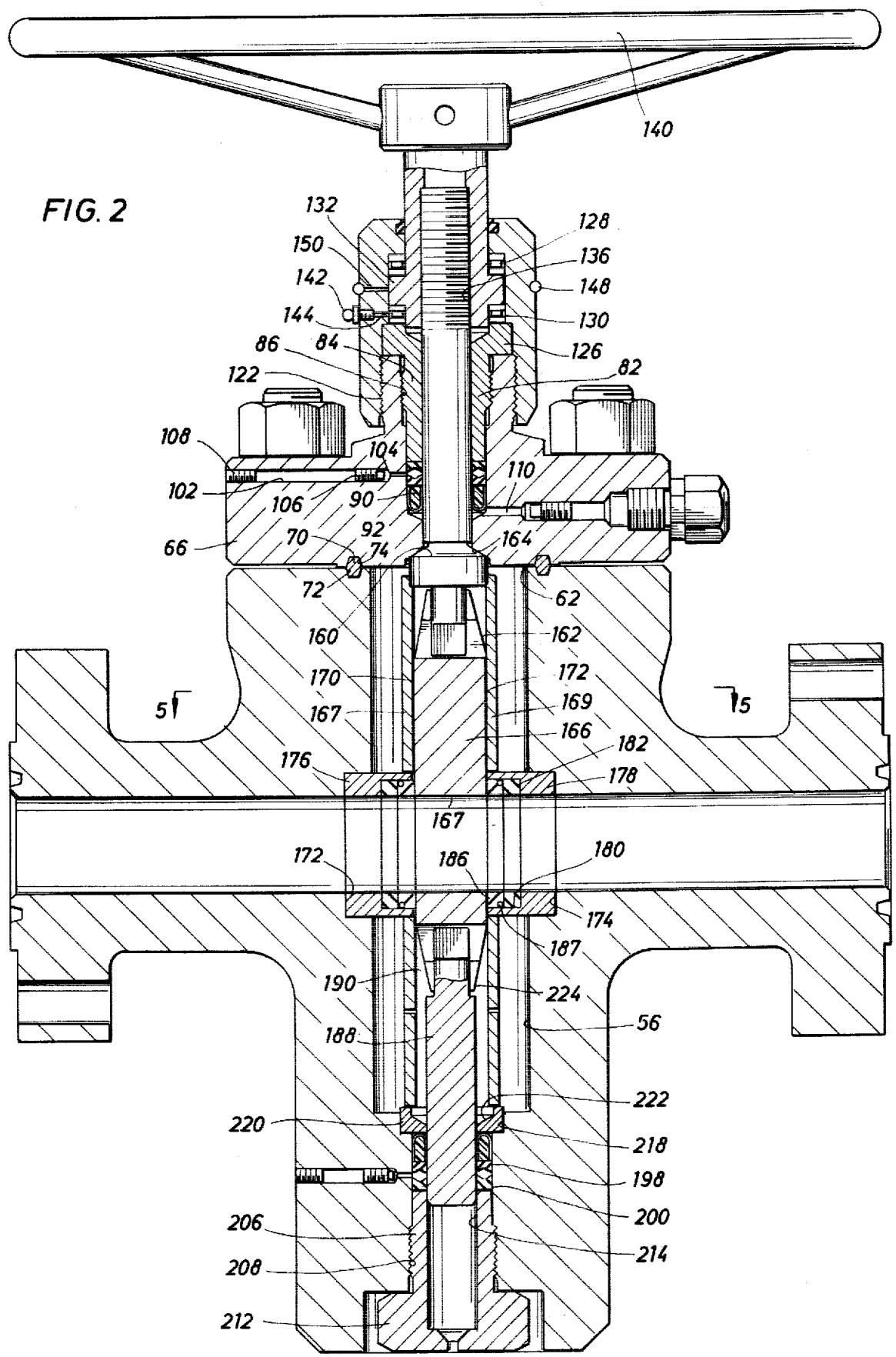

FIG. 2 is a cross-sectional view of a gate valve representing a modified embodiment of the invention wherein features similar to the embodiment of FIG. 1 are incorporated into a vented balanced stem valve construction.

Figure 3:
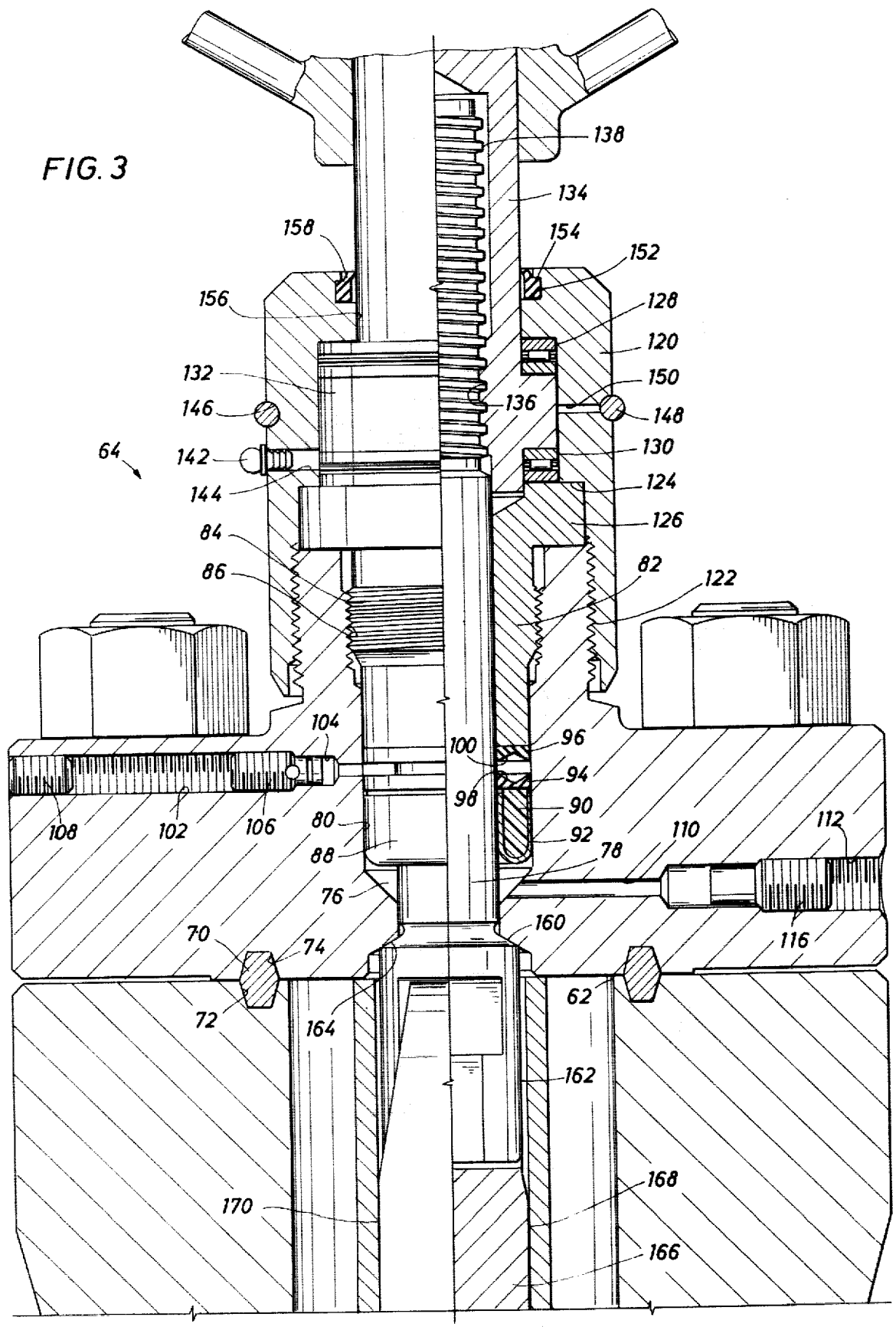

FIG. 3 is a partial sectional view of the upper portion of the valve mechanism of FIG. 2 illustrating portions of the bonnet and operating stem system in detail.

Figure 4:
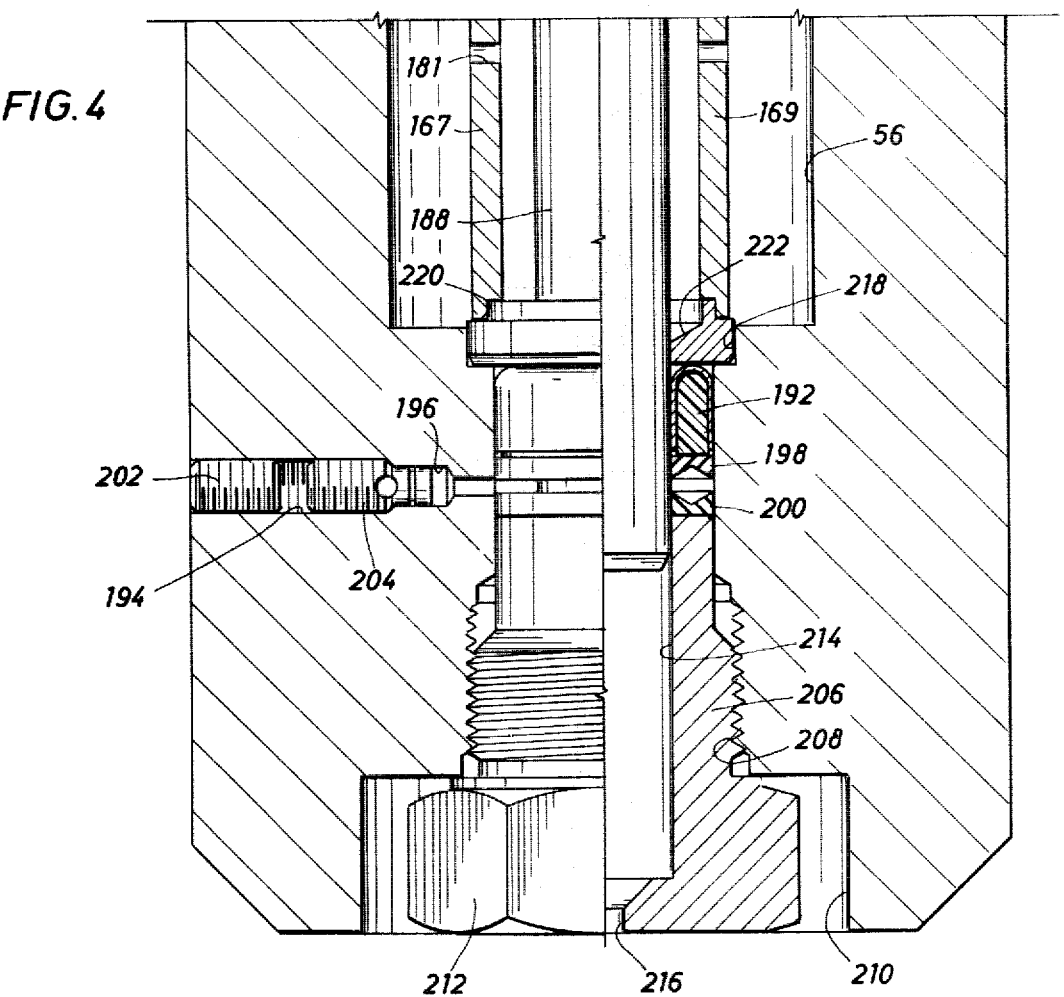

FIG. 4 is a fragmentary sectional view of the lower portion of the valve of FIG. 2, illustrating the balancing stem and packing system in detail.

Figure 5:
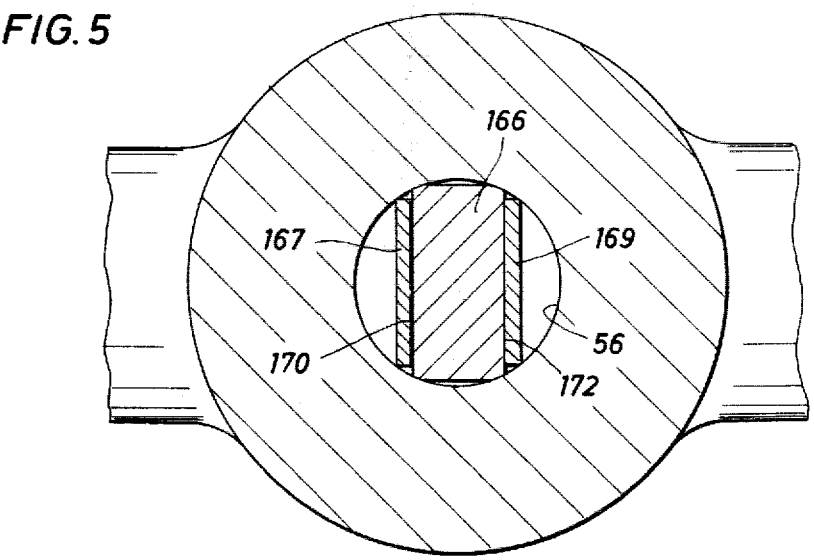

FIG. 5 is a sectional view taken along line 5—5 of FIG. 2.

Figure 6:
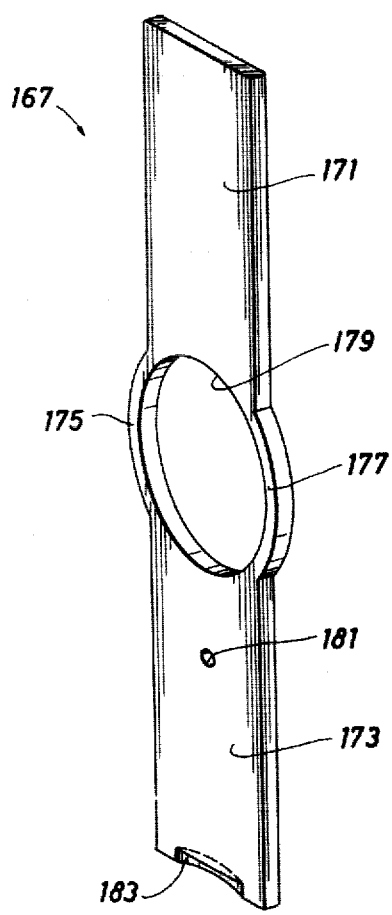

FIG. 6 is an elevational view of one of the gate guide elements of FIG. 2.

Figure 7:
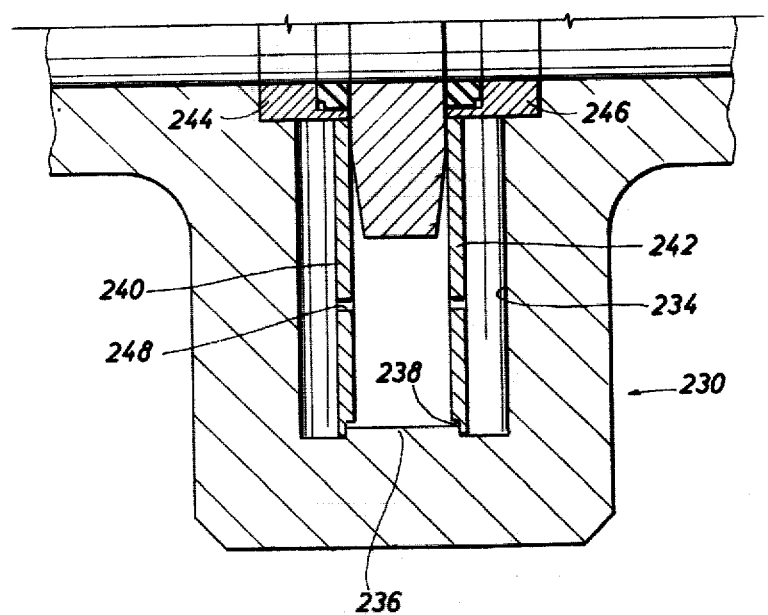

FIG. 7 is a fragmentary sectional view of a non-pressure balanced gate valve incorporating the gate guide system of the invention and representing a modified embodiment.

Figure 8:
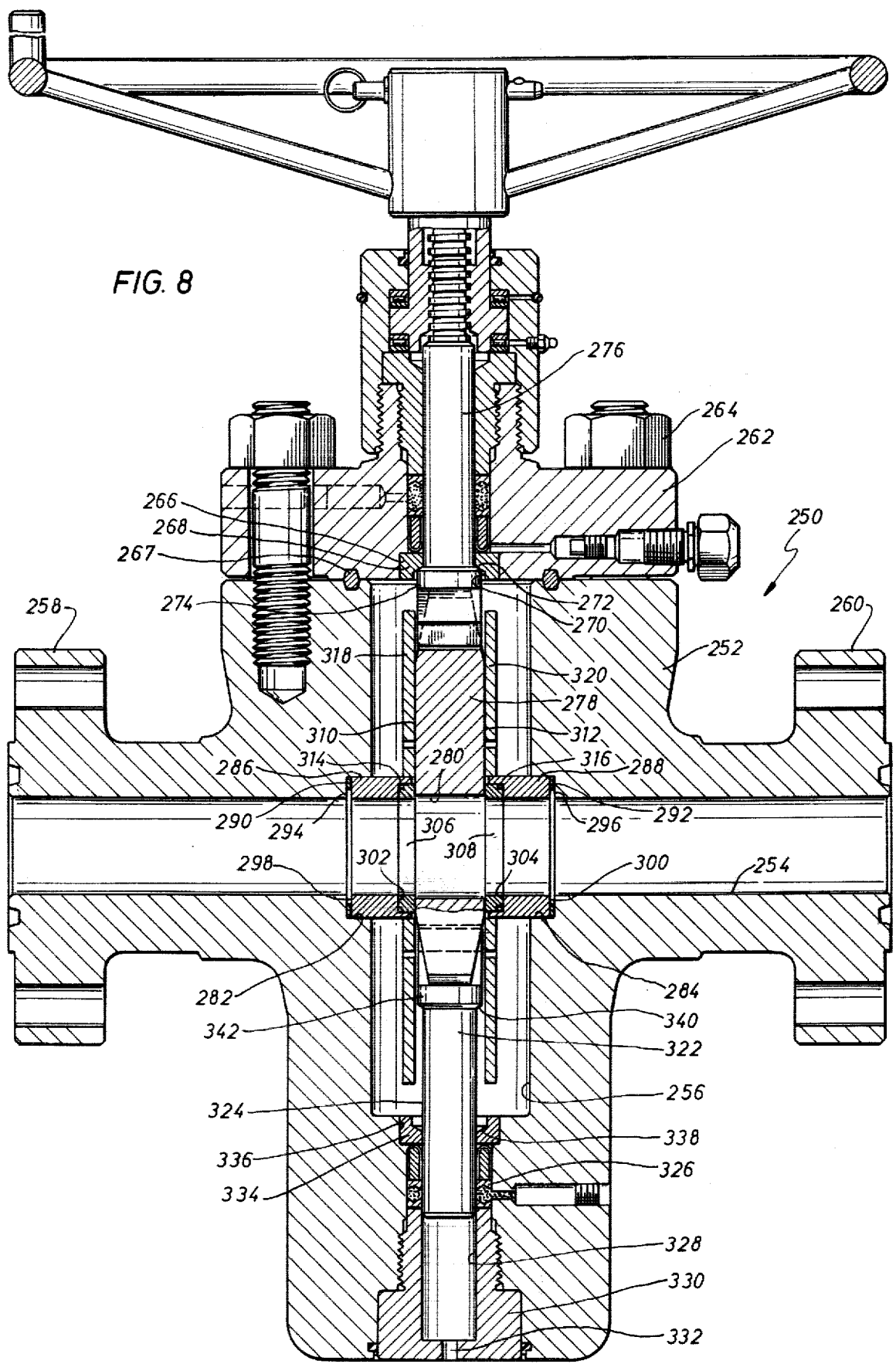

FIG. 8 is a sectional view of a pressure balanced gate valve representing another embodiment of the invention.

DESCRIPTION OF THE PREFERRED EMBODIMENT

Referring now to FIG. 1, a gate valve 10 is shown in the open position. Valve 10 includes a body 11 having aligned cylindrical inlet and outlet flow passages 12, 13, respectively, at opposite sides of valve chamber 17. Chamber 17 is closed at its upper end by bonnet 20 which may be attached to body 11 by a plurality of bolts 21. A ring gasket 28 prevents pressure loss from the chamber 19.

Interiorly of valve chamber 19 is a reciprocating gate member 40. The gate member 40 has a passage 41, which in the open position of the valve is aligned with the conduits 12, 13, forming therewith a smooth conduit for the uninterrupted flow of fluid through the valve.

An operating stem 30 is attached to one extremity of gate member 40 for moving gate member 40 between its open and closed positions. The gate member 40 shown in FIG. 1 is of the parallel sealing face slab-type and is illustrated in its open position.

Operating stem 30 is a rising stem and, as is known in the art, is reciprocated by an actuating handle 14 or any of numerous manual or power operated means for achieving vertical stem reciprocation, connected to stem nut 15 which is supported by thrust bearings 17 and 18. Bearing housing 29 threadingly mates with bonnet 20 and supports thrust bearings 17, 18.

The passage for operating stem 30 through bonnet 20 is formed to define a packing chamber within which may be received a stem packing element or assembly 27, which maintains a fluid tight seal between stem 30 and bonnet 20. The packing is retained against pressure induced axial movement by packing retainer nut 25 which is shouldered against the upper portion of the bonnet and provides restraint for the retainer gland ring 26 that bears on the upper extremity of the packing. Further, the packing fitting assembly 24 and a check valve device 23 are provided which facilitate the introduction of a semisolid sealing material into the packing chamber to enhance the sealing ability of the packing as well as to provide an emergency sealing capability in the event packing 27 should develop a leak.

The pressure of the fluid within valve chamber causes a continuous force to be exerted on the valve stem which tends to expel the valve stem outwardly through the stem passage in the bonnet 20. The magnitude of this force may be calculated as the exposed cross-sectional area of the valve stem, defined by the circular periphery of engagement between the stem and the stem packing, multiplied by the pressure of the fluid controlled by the valve. Ordinarily, the pressure induced force acting upon the valve stem must be overcome by force applied through the valve actuator mechanism in order to move the gate member of the valve in a direction opposing this force. The valve actuator mechanism is therefore typically required to be of sufficient structural integrity to withstand forces overcoming the pressure induced forces as well as other inherent forces such as friction losses, for example. It is desirable therefore to provide means for overcoming, at least to a substantial degree, the effect of pressure induced force acting upon the valve stem.

In view of the fact that the pressure induced force acts continuously upon the valve stem, this force is also applied through the stem actuating mechanism and can be disadvantageous. To relieve the valve actuating mechanism of the necessity for continuously overcoming such pressure and additionally for the purpose of enhancing the stem sealing ability of the valve mechanism, in the embodiment of FIG. 1, the operating stem 30 is provided with an enlarged sealing flange 31 with a frusto-conical sealing surface 32 defined on the upper face of the sealing flange. The bonnet 20 defines a mating frusto-conical surface 32 in a metal-to-metal sealing relationship when the operating stem is in the fully open or uppermost position thereof. The enlarged flange 31 thereby acts both to provide additional sealing ability in the area of the valve stem and functions to resist the pressure induced force acting upon the valve stem when the metal-to-metal seating and sealing engagement is maintained. It is not possible for the valve stem to be ejected from the bonnet structure because of the cooperative structural relationship between the bonnet and stem.

Gate member 40 is also provided with balancing stem 34 extending downward from gate member 40 into balancing cavity 39. Balancing cavity 39 is sealed from valve chamber 19 by means of packing 37 and packing gland 36 which are retained in position by spring washer 35. Balancing stem 34 further defines an internal bore 38.

When gate valve 10 is initially constructed, the space defined by variable volume balancing cavity 39 and internal bore 38 is filled with a gaseous material, generally air or an inert gas, and sealed from the valve chamber 19 by the packing 37 as hereinabove discussed. The gaseous material remains within the variable volume chamber during installation and subsequent operation of the gate valve. Internal bore 38 acts in cooperation with balancing cavity 39 in the following manner. When gate member 40 is lowered to its closed position, balancing stem 34 moves into balancing cavity 39, compressing the gaseous material contained therein. The original volume, equal to balancing cavity 39 volume plus internal bore 38 volume, is reduced to substantially the volume of internal cavity 38. A compression ratio is thus formed equal to the ratio of the original volume of the chamber as compared to the final volume of the chamber. The pressure increase within balancing cavity 39 is directly proportional to this compression ratio.

During operation of the gate valve, an upward force on the valve is produced equal to the operating stem 30 cross-sectional area time the difference between the operating pressure within valve chamber 19 and atmospheric pressure. This force may be balanced by a balancing stem 34 extending opposite from operating stem 30 and of generally equal cross-sectional diameter. In a conventional balanced stem gate valve, the balancing stem is open to atmospheric pressure to obtain equal pressure differentials across the operating stem and the balancing stem. In the gate valve which is set forth in FIG. 1, balancing stem 34 extends into sealed balancing cavity 39 which is at generally atmospheric pressure when the valve is fully open. When gate 40 is moved to the closed position, the pressure with balancing cavity 39 increases so that an exact force balance is not maintained. However, the imbalance is small, equal to the compression ratio multiplied by the cross-sectional area of balancing stem 34 and further multiplied by the atmospheric pressure.

The force needed to operate gate 40 from an open to a closed position is that force needed to overcome friction forces from gate-seat contact and stem-seal contact and to counter pressure imbalance. In the balanced stem arrangement, hereinabove discussed, the pressure imbalance is reduced to a low level and the required operating force is substantially that force required to produce sufficient torque to overcome frictional forces.

It should be noted that the concept of providing for a low compression ratio might also be obtained by lengthening balancing cavity 39. However, this requires additional material in valve body 11 and increases the size and cost of the gate valve 10. The embodiment of FIG. 1 illustrates a balancing stem 34 being formed to define an internal bore or cavity that cooperates with the balancing stem bore to develop a variable volume chamber of substantial volume. It should also be noted that as an additional feature, a drain valve and fitting assembly 39a of any suitable type may be interconnected with balancing cavity 39 in order to remove any material that might accumulate therein by leakage through the seal.

It should be further noted that in the event of leakage through the packing 37, that pressure will build up inside balancing cavity 39 to reduce the pressure differential across packing gland 36 and packing 37 so that further deterioration of the packing members will be slowed. Such a leak will manifest itself by an increase in the torque required to actuate gate member 40 from an open to a closed position and the operator can act to drain balancing cavity 39 and collect the material contained therein without contaminating the environment around gate valve 10. Additional gaseous material might also be introduced into cavity 39 through the drain valve means 39a.

In addition to the balanced stem arrangement which reduces operating torque, it is contemplated within the scope of the improved gate valve, which is the subject of the present invention, that an improved valve seat be provided which additionally reduces the torque needed to open and close the gate member 40 against the differential pressure across gate member 40 and between inlet and outlet conduits 12 and 13. It is well known in the prior art to provide a floating valve seat wherein the valve seats are continuously urged against the gate member during normal operation of the valve and which allow lateral movement of the gate member to occur when the full system pressure differential is applied across the gate member.

According to the present invention, seat retainers 42, 46 are disposed within cylindrical cavities bored in valve body 11 and concentric with inlet and outlet conduits 12, 13. Valve seats 45 and 49, which may be composed of metal or non-metal seat material, are concentrically disposed interiorly of seat retainers 42, 46 and sealed by sealing rings 44 and 48, respectively. Back-up seat rings 43 and 49 are defined by relatively hard material such as tungsten carbide.

Conventional arrangements of valve seats and seat retainers often develop spaces or voids that are open to the fluid stream when the valve seat is urged against the gate. Such spaces or voids develop increased resistance to fluid flow through the valve and, more importantly, develop spaces or voids that receive deposits of particulate material, such as line scale, sand, etc., contained in the fluid. Accumulation of such particulate can result in the inability of the floating seat to accomodate lateral movement of the gate while continuously sealing against the gate. In the present invention, spaces or voids are open to the fluid stream since resilient rings 43, 47 fill their respective cavities. As resilient rings 43, 47 expand and contract during lateral movement of the gate, it is apparent that a uniform conduit for fluid flow is maintained and that no particulate matter can accumulate so as to interfere with the operation of gate 40.

Alternate arrangements between the valve seat and the seat retainer ring may be used within the spirit and scope of this invention, i.e., using a resilient ring generally of a cylindrical shape to uniformly urge the valve seat toward the gate member, which resilient ring is non-metallic.

In operation, therefore, gate member 40 is moved from an open position to a closed position by turning valve handle 14 which turns operating nut 15 and moves valve stem 30 in a downward direction. The pressure differential forces across valve stem 30 which tend to resist downward movement of gate member 40 and increase the required operating torque, are substantially balanced by the pressure differential forces across balancing stem 34. As balancing stem 34 moves within balancing cavity 39, the material contained therein is compressed but the compression ratio is maintained at a low level due to including internal bore 38 within balancing stem 34 so as to develop a variable volume chamber of substantial volumetric dimension. The small pressure increase in balancing cavity 39 is insignificant compared with the large pressure differential which exists between the interior of valve 10 and internal cavity 39 and substantial pressure balancing is achieved without venting the pressure balancing stem to ambient pressure.

After gate member 40 has been moved to a closed position, there exists a pressure differential across gate member 40 which tends to move gate member 40 in a lateral direction. This lateral movement is absorbed by compression of resilient ring 43 where inlet conduit 12 remains pressurized and resilient ring 43 exerts a uniform continuous pressure against valve seat 45, whereby valve seat 45 is retained in uniform alignment with gate member 40. Resilient ring 47, located on the pressurized side, expands to accommodate the lateral movement of gate member 40 and continues to exert a uniform sealing force against valve seat 49, whereby gate member 40 remains continuously in a sealed relationship with valve seats 45 and 49.

When gate member 40 is returned to the open position, resilient rings 43 and 47 again accommodate the lateral movement due to the reduction in differential pressure across gate member 40 and the uniform sealing pressure exerted by these resilient rings minimizes the torque required to overcome the friction forces generated by sliding gate member 40 against valve seats 45 and 49.

Referring now to FIGS. 2, 3 and 4 of the drawings, which represent a modified embodiment of the present invention, a slab-type gate valve is illustrated generally at 50 which comprises a valve body structure 52 that is formed to define a flow passage 54 that intersects a valve chamber 56 and terminates at connection flanges 58 and 60. The valve chamber 56 defines an opening 62 at the upper extremity of the valve body, which opening is closed by means of a bonnet assembly illustrated generally at 64. The bonnet assembly incorporates a flange 66 that is secured directly to the upper extremity of the valve body 52 by means of a plurality of stud and nut assemblies 68 and is sealed with respect to the valve body by means of an annular sealing element 70 that is received within mating annular grooves 72 and 74 that are defined, respectively, in the valve body and bonnet. The annular sealing element 70 may be formed of any suitable sealing material but, as is typically the case in high pressure valves, the sealing member will be composed of metal and is typically referred to as a BX metal ring gasket.

The flanged body structure of the bonnet is also formed to define a stem and stem seal passage 76 through which a valve stem 78 extends from the valve chamber 56 through the bonnet. The valve stem passage also defines an enlarged diameter portion 80 that is adapted to receive a packing assembly surrounding the valve stem 78 and being retained in position within the packing chamber by means of a packing gland 82. The packing gland is formed to define external threads 84 that mate with internal threads 86 defined within the upper portion of the flanged body portion of the bonnet. The packing assembly, which maintains a fluid tight seal between the valve stem 78 and the bonnet assembly, may incorporate an annular sealing element 88 having a core portion 90 that may be formed of any suitable packing material, such as Viton, for example, and which is provided with a wear resistant outer covering 92 that may be composed of a material such as polytetrafluoroethylene or the like. Immediately above the packing element 88 may be located a pair of annular, wear resistant packing elements 94 and 96 that are formed to define generally "V-shaped" grooves 98 and 100. The annular sealing elements 94 and 96 may be composed of a material such as filled polytetrafluoroethylene or any other suitable material. The flange portion 66 of the bonnet may be formed to define an elongated threaded bore 102 which communicates with a lubricant and sealant passage 104 that is so positioned, with respect to the annular sealing elements 94 and 96, that a lubricant and sealant material may be injected into the space between the sealing elements. A semisolid sealant composition for injection into the packing chamber in this manner might include polytetrafluoroethylene or any number of other plastic sealant materials. The semisolid sealing material within the annular space between the packing elements 94 and 96 will enhance the sealing ability of the stem seal. In the event the stem seal should become worn to the point that any leakage occurs, additional semisolid packing material may be injected through a check valve structure 106 within the threaded bore 102 by means of an externally threaded injection plug 108 that may be moved linearly through the threaded door 102 by means of an Allen wrench or any other suitable implement.

For the purpose of further enhancing the sealing ability between the valve stem and bonnet, the flange portion 66 of the bonnet assembly may be formed to define an injection passage 110, the outer portion of which is internally threaded at 112 and 114 for the purpose of receiving check valve type injection elements 116 and 118, respectively. By connecting a "grease gun" type sealant injecting device to the injection fitting 118, a semisolid sealant material of any acceptacle character may be injected into the annular space defined by that portion of the packing chamber 76 immediately below the annular packing member 90. It is apparent, therefore, that sealant material may be injected into the packing chamber below the packing assembly as well as within the packing assembly itself. The exceptional sealing ability of the packing system, therefore, lends utilization of the valve mechanism to extremely high pressure environments.

A thrust bearing retainer element 120 is threadedly received by the externally threaded upper portion 122 of the bonnet 66 and defines an internal shoulder 124 that engages the upper flanged portion 126 of the packing flange 82. The bearing retainer element 120 defines an internal bearing chamber within which is located a pair of thrust bearing assemblies 128 and 130 that receive thrust loading from an annular flange 132 of a drive nut element 134. The drive nut element is formed to define internal threads 136 that receive the upper externally threaded portion 138 of the valve stem 78. As the drive nut element 134 is rotated by means of a hand wheel 140, or any other suitable manual or powered rotating mechanism, the valve stem 78 is moved upwardly or downwardly by the interrelating threads of the valve stem and drive nut. Linear force transmitted from the valve stem to the drive nut is compensated for by the thrust bearing assemblies 128 and 130, depending upon the direction of valve stem movement. The thrust bearings may be lubricated by injection of lubricant material through a lubricant fitting 142 that is retained within a lubricant passage 144 communicating with the thrust bearing chamber. An annular external groove 146 is formed in the retainer element 20 and receives a sealing member 148 such as an elastomeric O-ring therein. The annular groove 146 is communicated with the bearing chamber by means of at least one passage 150 through which lubricant material, injected through lubricant fitting 142, may escape to prevent the build-up of excessive pressure within the bearing chamber. As pressure builds up within the chamber, excess lubricant material will displace the annular sealing element 148 sufficiently to allow escape of some of the lubricant. The annular sealing element 148 also provides a tell-tale system for determining any leakage of the packing assembly. As leakage occurs, fluid bypassing the stem packing will flow upwardly into the bearing chamber and, by partially displacing the annular sealing element 148, will provide an indication that the packing assembly requires adjustment. Semisolid packing material may then be injected in the manner described above to re-establish proper sealing of the packing assembly. Cessation of leakage through the bleed passage or weep port 150 will indicate that the packing assembly has re-established a proper seal between the valve stem and bonnet.

A thrust bearing retainer element 120 may also be formed at the upper extremity thereof to define an annular seal receptacle 152 within which may be received a sealing element 154 that prevents dust and other debris from entering the bearing chamber through a drive nut opening 156. An annular flexible portion 158 of the sealing element 154 tightly engages the cylindrical outer periphery of the drive nut 134 and maintains an adequate seal to prevent entry of dust and debris into the bearing chamber.

It may be desirable to provide a mechanical metal-to-metal seal between the valve stem and the bonnet under certain conditions. In accordance with the present invention, such is readily accomplished by mating engagement between a tapered or frusto-conical surface 160 that is defined by an enlarged coupling portion 162 formed at the lower extremity of the valve stem. The tapered surface 160 is capable of moving into metal-to-metal sealing engagement with a mating tapered surface 164 that is defined about the stem passage of the bonnet 66. Movement of the valve stem 78 to its maximum upward position will bring the tapered surface 160 and 164 into mating sealing engagement in the event a metal-to-metal seal is desired.

A slab type gate element 166 is movably positioned within the valve chamber 56 and is coupled in typical manner to the coupling portion 162 of the valve stem. Thus, movement of the valve stem in the upward or downward direction causes upward or downward movement of the gate member 166 within the valve chamber. The gate member may be composed of stainless steel material which is overlaid with tungsten carbide material in such manner as to define parallel tungsten carbide sealing faces 168 and 170. The gate member 166 may be composed of other suitable materials within the scope of the invention, it being appropriate only to provide the gate with the capability of effectively resisting a wide range of service conditions such as corrosive and erosive environments, as well as providing extremely long wear resistant operating life.

Also received within the valve chamber 56 are a pair of gate guide elements 167 and 169, one of which is illustrated in detail in FIG. 6. Each of the gate guide elements includes substantially planar and generally rectangular upper and lower portions 171 and 173 that are interconnected by an enlarged intermediate portion defined by arcuate portions 175 and 177. An aperture 179 is defined in the gate guide element and is adapted to receive one of the valve seal carrier elements shown at 176 and 178 in FIG. 2. Pressure relief apertures are formed in each of the gate guide elements as shown at 181 in FIG. 6 to prevent the development of a pressure differential across the gate guide elements. Thus, the gate guide elements may be constructed from lightweight metal and are not susceptible to becoming distorted or bent by pressure induced forces.

At one extremity of each of the gate guides is located an arcuate recess 183 that receives a portion of a projection extending into the valve chamber 56. As shown in FIG. 2, the upstanding projection is defined by the metal sealing element 220 whereas in FIG. 7 the body structure is formed to define an internal projection.

The valve body may also be formed to define opposed seat recesses 172 and 174 within which may be received carrier rings 176 and 178. The carrier rings, although capable of being composed of a wide range of materials, for maximum effectiveness in a wide range of erosive and corrosive service environments, are typically composed of stainless steel. Each of the carrier rings may be formed to define a seat recess 180 within which may be received a pair of seal rings 182 and 184. Seal rings 182 may be composed of an extremely hard, wear resistant material, such as tungsten carbide, to function as a back-up seal. The sealing ring 184 functions as a face seal with a planar sealing portion 186 thereof engaging the respective sealing face 168 or 170 of the gate. The sealing ring 184, defining the face seal, may be composed of an extremely hard and wear resistant material, such as stellite, which effectively cooperates with the tungsten carbide sealing surfaces of the gate to provide exceptional sealing ability while effectively preventing galling or excessive wear of the gate or seats as the gate is moved relative to the seats. This feature is especially important under high pressure conditions that develop forces of extremely high magnitude between the gate and the downstream seat. By employing a tungsten carbide overlay on the gate structure so as to define parallel tungsten carbide sealing face surfaces 168 and 170, it is insured that the forces between the gate and the stellite face sealing ring of the seat assemblies will not cause the gate and seat rings to become galled or excessively worn when the valve is operated under extremely high working pressure, such as 15,000 psig, for example. Moreover, these materials will effectively resist corrosion and erosion and will prove the valve mechanism effective for an extremely wide range of service conditions. For the establishment of a low pressure seal, a resilient sealing element 187 may be received within an annular seal recess defined within the face sealing rings 184. The low pressure sealing element may be formed of polytetrafluoroethylene, or any other suitable material.

As mentioned above, fluid pressure within the valve chamber 56 will at upon the cross-sectional area of the valve stem that is encompassed by the packing assembly. A force will thus be developed that acts upon the valve stem and tends to urge it in an outward direction. It is desirable to overcome this fluid pressure induced force with an equal and opposite force that substantially balances the resulting forces acting upon the gate member. In accordance with the present invention, as shown in FIG. 2, the gate member 166 is provided with a stem connection at the lower extremity thereof, which is identical with respect to the stem connection and its upper extremity. A pressure balancing stem 188 is positioned within the valve chamber 56 with an upper gate coupling 190 receiving the stem connection of the gate member. The pressure balancing stem extends downwardly through a lower packing assembly 192 that is essentially identical with respect to the stem packing assembly of the bonnet structure. An internally threaded injection bore 194 is formed in the body structure 52 and communicates with an injection passage 196 that opens into the packing chamber between annular opposed packing elements 198 and 200. By manipulating a sealant injection plug 202 by means of an Allen wrench or other suitable implement, semisolid sealant material may be injected through a check valve mechanism 204, threadedly received within the bore 194, for injection of sealant material through the passage 196 into the annular space between the packing elements 198 and 200. For the purpose of retaining the packing assembly of the pressure balancing stem in position within the valve body structure, an externally threaded retainer element 206 is received within an internally threaded portion 208 of the valve body. A recess 210 may be formed in the valve body structure to allow the head portion 212 of the retainer 206 to be appropriately received and protected by the valve body. The packing retainer 206 is formed to define an internal bore 214 of a size to receive the pressure balancing stem 188 as it moves downwardly upon downward movement of the gate member 166. Atmospheric pressure is communicated into the bore 214 of the retainer element by means of a vent opening 216, thus providing atmospheric or ambient pressure within the bore 214 regardless of the position of the pressure balancing stem 188.

It may also be desirable to provide a metal-to-metal seal between the pressure balancing stem and the valve body structure. Such is conveniently accomplished by forming the valve body to define a back seat seal recess 218 within which may be received a metal sealing element 220 having an internally tapered or frusto-conical surface 222 formed therein. The enlarged coupling portion 190 of the pressure balancing stem may be formed to define an externally tapered frusto-conical surface 224 that establishes sealing engagement with the tapered surface 222 when the gate member has moved the pressure balancing stem 188 downwardly to the full extent thereof. It is therefore apparent that the valve mechanism of the present invention incorporates metal-to-metal back sealing between each of the valve stems in order to provide metal-to-metal sealing ability in the fully opened and fully closed positions of the internal movable components of the valve mechanism. The annular metal back seating element 220 may be composed of a wide range of suitable materials for establishment of an appropriate metal-to-metal seat and may be received within the recess 218 simply by press fitting.

By providing the gate member 166 with identical stem connections at each extremity thereof, the gate member may be positioned within the valve structure in the manner illustrated in FIG. 2, or, in the alternative, may be inverted and positioned with the port 167 thereof at the upper portion of the gate. In this manner, by replacing the manual operator mechanism shown in FIG. 2 with a pneumatic actuator having a spring return, the gate member may be moved to its closed position by upward movement of the gate induced by the return spring of the actuator. This is typically referred to as "fail-safe" actuation. This reversible gate feature is also provided in the valve construction illustrated in FIG. 1.

Referring now to FIG. 7, which illustrates the lower portion of a non-pressure balanced valve mechanism incorporating the gate guide system of the invention, a valve is shown generally at 230. The valve 230 includes a body 232 defining a valve chamber 234 of similar configuration to the valve chamber 56 of the valve construction set forth in FIG. 2. The upper portion of the valve 230 may be essentially identical to the valve construction of FIG. 2.

The valve body structure of FIG. 7 is formed to define an internal projection 236 of circular cross-sectional configuration. The projection is received by arcuate recesses 238 defined in opposed gate guide elements 240 and 242 that are received by seat carrier elements 244 and 246 in the same manner as discussed above in conjunction with the valve structure of FIG. 2. Bleed ports 248 are formed in the gate guide elements to promote the existence of a balanced pressure condition on each side of the gate guides.

Referring now to FIG. 7, there is shown a gate valve structure generally at 250 which includes a valve body structure 252 that is formed to define a flow passage 254 intersecting a valve chamber 256 and having connection flanges 258 and 260 for connection of the valve body to a flow line. The valve chamber is closed by means of a bonnet structure 262 that is connected to the body by means of bolt and stud assemblies 264 and employs a sealing ring 266 to establish a seal between the valve body and bonnet. The bonnet structure and packing assembly of gate valve 250 is substantially identical as compared to the bonnet 66 of FIG. 2 and the various stem packing and stem actuator portions thereof. Bonnet 262, however, is formed to define a back seat recess 266 concentrically about the stem passage of the bonnet within which is received a stem sealing insert 268 that is composed of relatively hard metal that is suitable for the establishment of a seal with the valve stem. The insert 268 is formed internally to define a frusto-conical sealing surface 270 that is engaged by a mating frusto-conical sealing surface 272 that is defined on an enlarged portion 274 of the valve stem 276.

A gate member 278 is a reversible gate similar in construction to gate 166 of FIG. 2, the upper portion of which defines a blocking portion for interrupting the flow of fluid through the flow passage 254 while a port 280 formed at the lower portion of the gate may be brought into registry with the flow passage 254 to allow fluid flow through the flow passage. By simply reversing the gate member 278, the port 280 may be positioned at the upper portion of the gate rather than at the lower portion as shown in FIG. 8. This feature allows for utilization of the valve mechanism in conjunction with various types of valve actuators that may be employed to shift the gate member either upwardly or downwardly to a safe position responsive to the occurrence of some predetermined event, such as loss of downstream pressure that would indicate rupture of the flow line controlled by the valve.

In order to effectively adapt the valve mechanism 250 for service under extremely high pressure conditions, the valve body structure 252 is formed to define a pair of opposed seat recesses 282 and 284 concentrically about the flow passage 254 within which recesses are received a pair of opposed seat carrier rings 286 and 288 that are press-fitted within the respective recesses. For the establishment of an effective high pressure seal between the seat rings and the respective surfaces defined by the seat recesses, a pair of annular sealing rings 290 and 292 are positioned against abutment surfaces 294 and 296, defined by the respective seat recesses and annular planar abutment surfaces 298 and 300 are driven against the respective sealing rings 290 and 292. The sealing rings are composed of a dead soft metal material such as Armco soft iron, for example, manufactured by the Armco Steel Corporation, and are sufficiently deformed by the mechanical pressure applied through the abutment surfaces of the seat carrier rings such that the sealing rings deform and establish a surface-fitting relationship both with the abutment surface of the seat recess and the abutment surface of the seat carrier member. Since the seat carriers 286 and 288 are press-fitted within the respective seat carrier recesses 282 and 284, mechanical deformation and effective metal-to-metal sealing will remain established between the respective seat carrier rings and the valve body.

The seat carrier rings 286 and 288 are formed to define seal recesses 302 and 304 within which are received annular sealing members 306 and 308 that are composed of a hard, wear-resistant sealing material, such as stellite which is capable of establishing a non-galling, effective sealing relationship with sealing surfaces 310 and 312 defined by the gate member 278.

Each of the seat rings 306 and 308 are formed to define annular rear recesses which cooperate with the respective seat recesses 302 and 304 to define annular seal chambers within which are retained a pair of annular sealing elements 314 and 316. The sealing rings 314 and 316 may be composed of a suitable sealing material, such as polytetrafluoroethylene, which is filled with fiberglass. The sealing members 314 and 316 may also take the form of any other suitable combination of sealing materials within the spirit and scope of this invention, it being necessary only that a positive seal is established between the annular sealing rings 306 and 308 and the respective surfaces defining the seat recesses 302 and 304.

Gate guide members 318 and 320 that are supported by the seat carrier elements 286 and 288 and provide a guiding function for the gate member 278 are of substantially identical construction as compared to gate guide members 167 and 169 of FIG. 2. A lower stem or trunnion 322 is connected to the lower extremity of the gate member 278 and defines an outer cylindrical surface portion 324 that extends in sealed relation through a packing assembly 326 and into a trunnion receptacle 328 defined by a stem packing retainer member 330. An aperture 332 communicates the stem receptacle 328 with the atmosphere and thereby causes the pressure differential at the upper and lower valve stems to be substantially identical, thereby developing a balanced force condition. The gate member, therefore, may be moved within the valve chamber simply by overcoming the frictional forces acting thereon in response to the pressure developed by line fluid acting thereon.

It is not necessary to overcome any pressure induced influence acting either upwardly or downwardly on the gate member as in the case of nonbalanced gate valves.

A stem sealing insert 334 is positioned within a stem insert receptacle 336 defined at the lower portion of the valve body and is formed to define an internal frusto-conical sealing surface 338 that is engaged by a mating frusto-conical surface 340 defined by an enlargement 342 of the lower stem or trunnion 322, thus promoting the development of a metal-to-metal seal between the insert and the trunnion. This feature allows the packing 326 to be replaced while the valve is under pressure, in the event such is desirable.

It is apparent from the foregoing that I have provided a novel gate valve mechanism incorporating a pressure balancing actuating stem concept that effectively facilitates ease of valve operation through substantial elimination of the adverse effect of pressure induced forces that adversely affect efficient valve operation. Moreover, in accomplishing the various desired features of this invention, the lower balancing stem of the valve mechanism is maintained in a sealed relation eliminating the possibility of the valve leakage common with other pressure balanced valve mechanisms. I have also provided a novel gate valve mechanism incorporating a floating seat arrangement causing both of the seats of the valve mechanism to be urged toward the gate element at all times. Additionally, I have produced the valve mechanism of the invention with a metal-to-metal stem sealing capability and a stem and bonnet cooperative structure that prevents the stem from inadvertent separation from the bonnet.

A back seat and stem stop arrangement has been provided for positive positioning of the gate member in the open and closed positions of the valve and to provide metal-to-metal back seating capability for both the operating stem and the pressure balancing stem.

The gate and seat assemblies are formed to present sealing surfaces that are resistant to wear and friction forces to profide for low torque operation, resist galling and promote use of the valve mechanism in a wide range of service conditions.

It is therefore apparent that the present invention is one well adapted to attain all of the objects and advantages hereinabove set forth, together with other advantages which will become obvious and inherent from a description of the apparatus itself. It will be understood that certain combinations and sub-combinations are of utility and may be employed without reference to other features and sub-combinations. This is contemplated by and is within the scope of the present invention.

As many possible embodiments may be made of this invention without departing from the spirit or scope thereof, it is to be understood that all matters hereinabove set forth as shown in the accompanying drawings are to be illustrative and not in any limiting sense.

What is claimed is:

1. A gate valve mechanism comprising:
   a valve body having a valve chamber and inlet and outlet flow passages in communication with said valve chamber, annular seat carrier recess means being defined within said valve body about said flow passage means and forming a first annular abutment surface of generally planar configuration;
   gate means being movably disposed within said valve chamber and being movable between open and closed positions for controlling the flow of fluid through said flow passages;
   means for imparting opening and closing movement to said gate means;
   annular hard metal seat carrier means being disposed in interference-fitted relation within said seat recess means and defining a second annular abutment surface of generally planar configuration and an annular seat recess, said first and second abutment surfaces being oriented in substantially parallel relation;
   a substantially dead soft metal sealing ring being positioned within said seat carrier recess means and being in engagement with said first and second abutment surfaces, said dead soft metal sealing ring being of flat washer-like form and defining opposed annular flat surfaces being deformed by compressive engagement against said first and second abutment surfaces and establishing a seal between said valve body and said seat carrier means;
   a hard, wear resistant seat element being positioned within said seat recess and having sealing engagement with said gate means, said seat element cooperating with said seat carrier means to define an annular seal pocket therebetween; and
   annular resistant sealing means being disposed within said seal pocket and establishing a seal between said seat carrier means and said seat means.

* * * * *